United States Patent [19]
Yachi et al.

[11] Patent Number: 5,767,929
[45] Date of Patent: Jun. 16, 1998

[54] LIQUID CRYSTAL DISPLAY APPARATUS WITH SHORTING RING

[75] Inventors: Shigeru Yachi; Naoki Nakagawa; Shigeru Kikuda, all of Kikuchi-gun, Japan

[73] Assignee: Advanced Display Inc., Kikuchi-gun, Japan

[21] Appl. No.: 674,714

[22] Filed: Jul. 2, 1996

[30] Foreign Application Priority Data

Sep. 21, 1995 [JP] Japan ................ 7-242983

[51] Int. Cl.⁶ ............... G06F 1/1333; G06F 1/1343
[52] U.S. Cl. ............................... 349/40; 349/139
[58] Field of Search .................... 349/40, 42, 139

[56] References Cited

U.S. PATENT DOCUMENTS

| | | | |
|---|---|---|---|
| 5,233,448 | 8/1993 | Wu | 349/40 |
| 5,313,319 | 5/1994 | Salisbury | 349/40 |
| 5,373,377 | 12/1994 | Ogawa et al. | 349/40 |
| 5,504,348 | 4/1996 | Yoshida et al. | 349/43 |
| 5,596,342 | 1/1997 | Ikizaki et al. | 345/87 |
| 5,671,026 | 9/1997 | Shiraki et al. | 349/40 |

FOREIGN PATENT DOCUMENTS

| | | |
|---|---|---|
| 3-85525 | 4/1991 | Japan. |
| 5-2175 | 1/1993 | Japan. |
| 5-2176 | 1/1993 | Japan. |
| 5-2180 | 1/1993 | Japan. |
| 5-203986 | 8/1993 | Japan. |

*Primary Examiner*—William L. Sikes
*Assistant Examiner*—Toan Ton
*Attorney, Agent, or Firm*—Burns, Doane, Swecker & Mathis, LLP

[57] ABSTRACT

A liquid crystal display apparatus comprising: gate signal lines, source signal lines, thin film transistors, terminals, an insulating film and auxiliary lines provided to surround a circumference of a displaying section, wherein source signal lines are grouped into groups; and an extended length of the source signal line in an area outside of the displaying section and a surrounding length of the auxiliary line in the area outside of the displaying section are so determined that source signal lines in a group have intersecting portions only with a specified auxiliary line.

10 Claims, 8 Drawing Sheets

LIQUID CRYSTAL DISPLAY APPARATUS WITH SHORTING RING

BACKGROUND OF THE INVENTION

The present invention relates to a liquid crystal display apparatus and more particularly to a liquid crystal display which is mounted in a portable television, a wall-hunging type television, or a portable office equipment.

A typical liquid crystal display panel is constructed so that two substrates oppose each other and sandwitch a liquid crystal material between the two substrates. An electrical voltage is applied selectively to the liquid crystal material. That is, for example, on at least one of the substrates, pixel electrodes comprising a transparent conductive film are arranged in a matrix-like manner, and switching elements such as transistors by which an electrical voltage is selectively applied to each pixel electrode is provided to each pixel electrode so that a light transmission ratio is controlled on a pixel electrode by pixel electrode basis.

Recently, low production yield due to defects in a display line has become a problem, since the displays are now high precision type displays with an enhancement. Consequently, establishment of technique as a remedy for the defects in the display line has become necessary.

Figure 5:
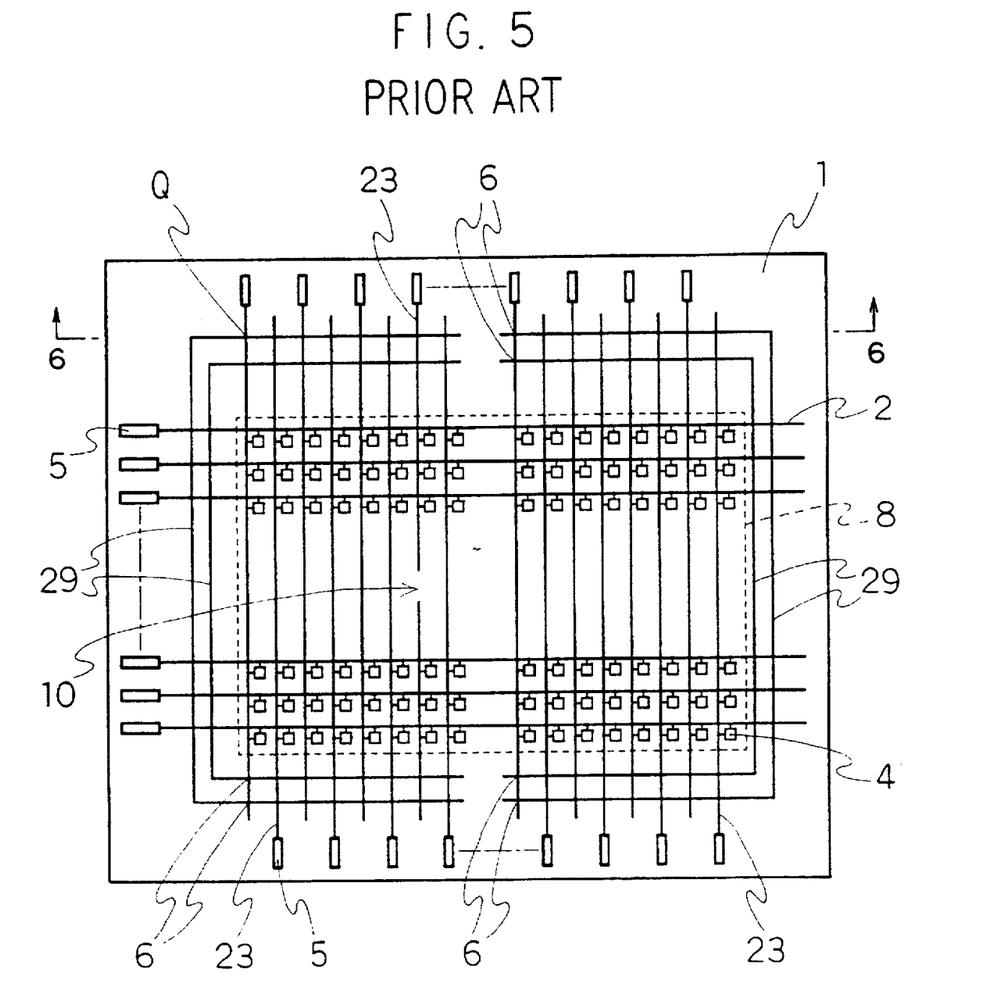
FIG. 5 is a plan view of an embodiment of a conventional liquid crystal display apparatus.
Figure 6:
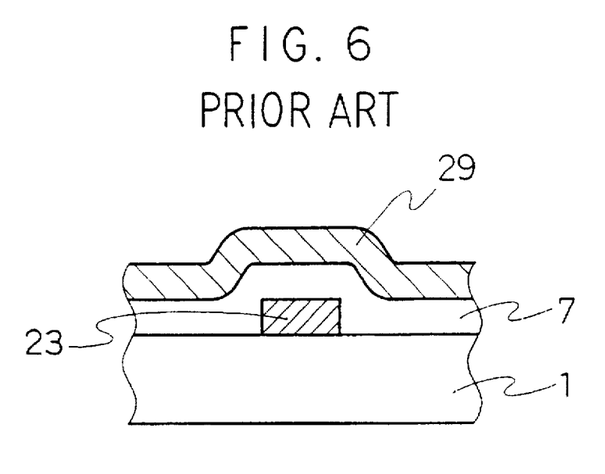
FIG. 6 is a cross sectional view illustrating point P and the neighborhood of the point P in a cross sectional view taken along line B—B in FIG. 5.

FIG. 5 is a plan view illustrating a conventional liquid crystal display apparatus which is disclosed, for example, in Japanese Unexamined Patent Publication No. 203986/1993. FIG. 6 is a cross sectional view illustrating point Q and the neighborhood of the point Q in a cross sectional view taken along line B—B. In FIG. 5 and FIG. 6, reference numeral 1 indicates a transparent insulating substrate, numeral 2 indicates a gate signal line, numeral 23 indicates source signal lines, numeral 4 indicates a thin film transistor, numeral 5 indicates terminals, numeral 6 indicates intersection portions, numeral 7 indicates an insulating film, numeral 8 indicates a displaying section, numeral 10 indicates a disconnection defect, and numeral 29 indicates auxiliary lines. The auxiliary lines 29 we arranged so that the lines 29 surround the circumferences of the displaying section and the lines 29 form the intersecting portions 6 as a right-angled portion. Further, the portions 6 are formed so that the auxiliary line forms intersecting portion of the source signal lines 23 through the insulating film 7.

In such a liquid crystal display, a disconnection defect 10 is repaired by connecting the source signal line 23 and the auxiliary line 29 electrically by irradiating a laser beam to the intersecting portion 6 formed at the both ends of the source signal line 23 which has had a portion of disconnection defect 10 so that the insulating film is fused.

In such a liquid crystal display, a disconnection of the gate signal line 2 or of the source signal line 23 or a short-circuiting between the gate signal line 2 and the source signal line 23 is liable to occur. The disconnection or the short-circuiting results from an inferiority due to, for example, an internal stress occurring in a metal film such as the gate signal line 2 or the source signal line 23. An internal defect occurring in the metal film when patterning is performed or an non-uniformity of covering of the thickness of the metal film at a portion having a level difference as is shown in FIG. 6, like a step in a portion having such a level difference between a surface raised by a source signal line 23 and the remaining surface. Since the above-mentioned defects result in a line defect in a displaying section if those defects are left as they are, a display panel having the line defect cannot be used as a commercial product. Among the above-mentioned defects, the short-circuiting defect may be repaired, for example, by cutting both sides of the circuiting portion of the source signal line 23 with a laser beam. The signal line which was cut, however, will result to the line defect in the displaying section, as it is. After all, it is understood that the disconnection defect is critical. The above-mentioned method using the laser beam was proposed as a means for repairing the disconnection defect.

The method is advantageous in view of the cost effectiveness since the auxiliary line 29 is provided inside of the display panel and since it can be confirmed whether the line defect may be repaired or not before highly value-added external circuits are mounted.

In such a liquid crystal display shown in FIG. 5, however, the auxiliary line 29 forms intersecting portions 6 between all the source signal lines 23. In the intersecting portions 6, since a parasitic capacitance the magnitude of which is approximately 0.2 pF is formed, the capacitance of the source signal line in which the disconnection is repaired increases as compared with the source signal line having no disconnection.

In recent years, since a liquid crystal display is enhanced in displaying characteristics and is full-colored, the number of the signal lines are increased. For example, a display in super video graphic array (SVGA) class has 600 gate signal lines 2 and 2400 source signal lines 23. When a disconnection occurs in the central area of the displaying section, the total capacitance of the signal lines which are repaired amounts up to 700 pF and is seven times the capacitance, approximately 100 pF, of the sole source signal line 23. The resistance including an output resistance of the external circuit to which signals are inputted through the terminal 5 is approximately 10 k$\Omega$ whether the disconnection is repaired or not. Consequently, when the disconnection is repaired, the time constant of the signal becomes seven times (7 μsec). As a result, due to a significant delay of the signal on displaying, a line defect is defected. After all, the line defect is not able to be repaired.

Figure 7:
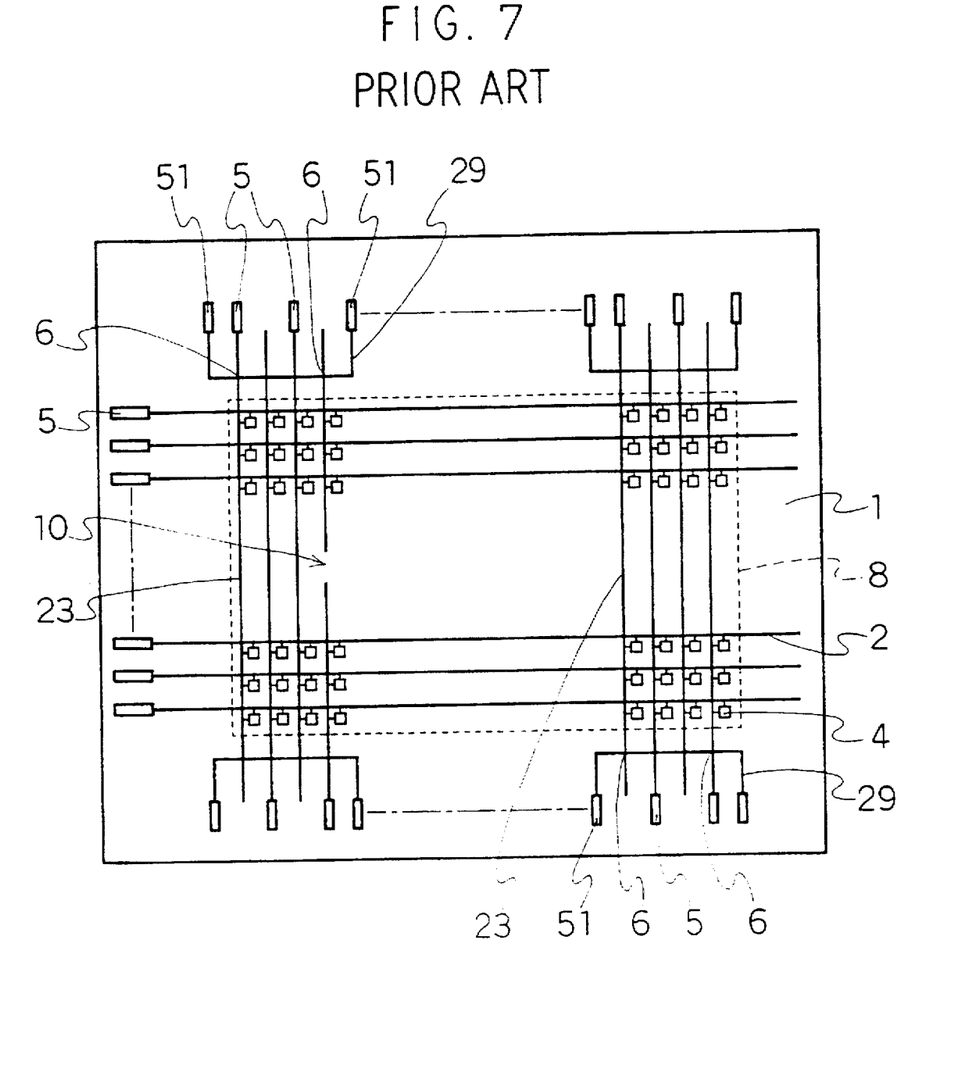
FIG. 7 is a plan view of another conventional liquid crystal display apparatus for solving the problem related with the conventional liquid crystal display apparatus.
Figure 8:
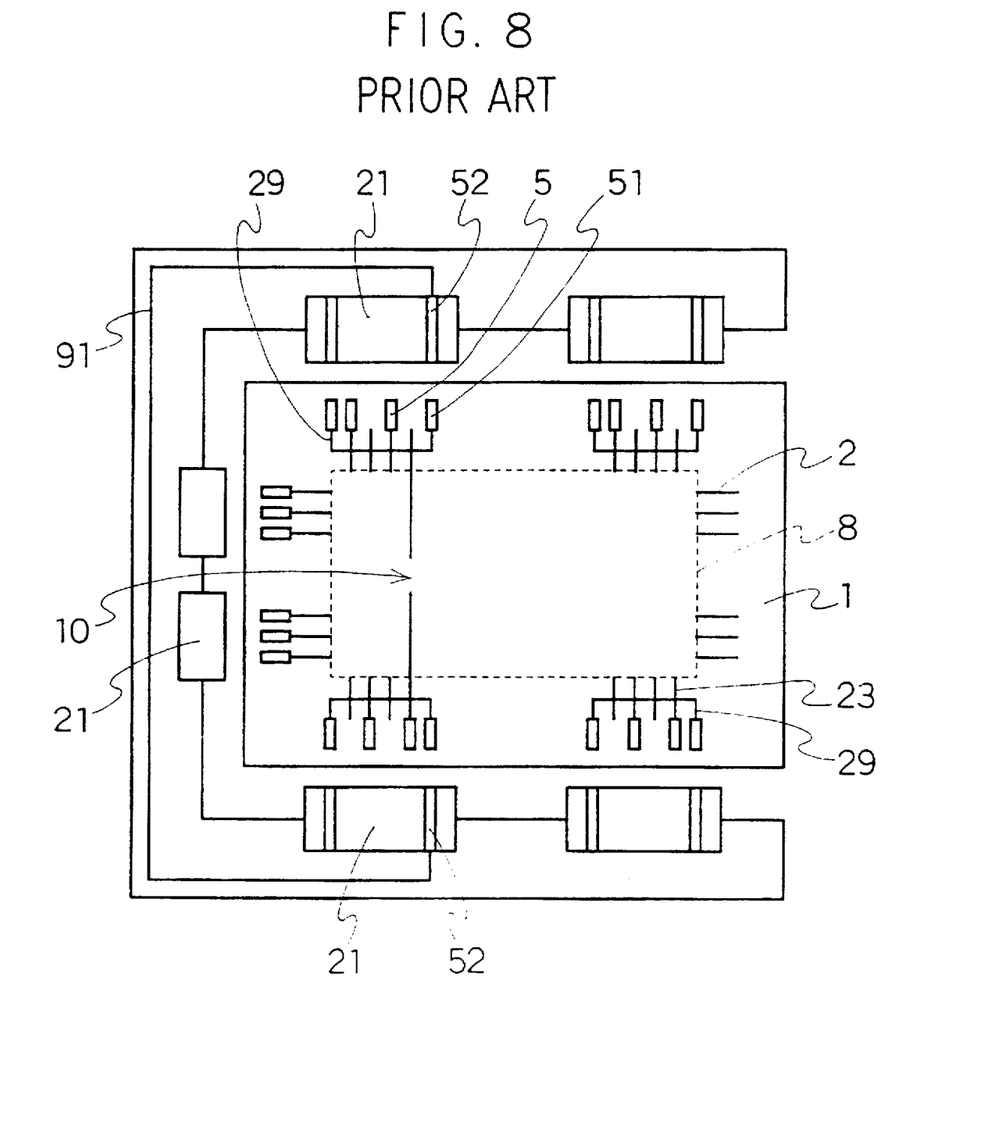
FIG. 8 is an explanatory diagram illustrating the method for repairing the disconnection defect in the conventional liquid crystal display apparatus.

So as to suppress the increment of the above-mentioned repaired time constant of the signal, i.e. the increment of the parasitic capacitance of the repaired signal line, for example, a composition which is described in Japanese Unexamined Patent Publication No. 85525/1991, is proposed as shown in FIG. 7. FIG. 7 is a plan view illustrating a conventional embodiment. In FIG. 7, reference numerals 1 to 8, 23 and 29 indicate the same portions as the numerals in FIG. 5. A reference numeral 51 indicates reserved terminals. FIG. 8 is an explanatory diagram illustrating the method for repairing the disconnection defect in the conventional liquid crystal display. In FIG. 8, reference numerals 1 to 8, 10, 23, 29 and 51 indicate the same portions as the numerals in FIG. 7. A reference numeral 21 indicates a circuit board for a driver IC, numeral 22 indicates a circuit board for a control circuit, numeral 52 indicates reserved lines, and numeral 91 indicates a line. In the above conventional embodiment, a plurality of source signal lines 23 are grouped into a set of signal lines, and an auxiliary line is arranged so that the auxiliary line forms intersecting portions between the set of the source signal lines and so that the auxiliary line is connected to a reserved terminal 51 provided at the both ends of the set of the source signal lines. In addition, electrical conduction is performed via a reserved line 52 and a line 91 both provided in a circuit board 21 for a driver IC and a circuit board 22 for a control circuit, both boards 21 and 22 being mounted on a panel, as shown in FIG. 8.

In the above-mentioned conventional embodiment, the number of the source signal lines which intersect the auxiliary line 29 is so decreased that the parasitic capacitance is decreased. Consequently, the delay of the signal remains uncritical. However, it is not able to be confirmed whether the defect is repaired or not before the board for the driver IC and the board for the control circuit are mounted. Therefore, when the conduction of the connected portion is not sufficient, such these expensive boards are also scrapped. Such post-confirmation is exceedingly disadvantageous in view of the cost-effectiveness.

It is an object of the present invention to eliminate the above-mentioned problem, and to present a liquid crystal display apparatus which is cost-effective in which the delay of the signal can be prevented and in which a line defect is so easily repaired.

SUMMARY OF THE INVENTION

According to one aspect of the present invention, there is provided a liquid display apparatus comprising:

a plurality of gate signal lines provided in parallel with each other and spaced at substantially equal intervals;

a plurality of source signal lines provided in parallel with each other and spaced at substantially equal intervals, the source signal lines crossing to the gate signal lines at a right angle;

thin film transistors each of which is provided at each intersecting portions of the gate signal lines and the source signal lines;

terminals each of which is provided at each one end portion of the gate signal lines and at each one end portion of the source signal lines;

an insulating film formed over the gate signal lines, a neighborhood of the end portions of the gate signal lines and a neighborhood of the end portions of the source signal lines;

a plurality of auxiliary lines provided to surround a circumference of a displaying section in which the thin film transistors are provided, wherein the source signal lines are grouped into some groups of the source signal lines, the group consisting of a plurality of source signal lines which are adjacent to each other;

and an extended length of the source signal line in an outside area of the displaying section and a surrounding strength of the auxiliary line in the outside area of the displaying section are so determined that, in each of the group, the source signal lines in each group have intersecting portions with a specified auxiliary line through the insulating film;

and both the source signal lines and the auxiliary lines are provided by determining both the extended strength of the source signal lines and the surrounding strength of the auxiliary line.

Preferably, the insulating film is made from one selected from the group consisting of silicon nitride, silicon oxide and tantalum oxide.

According to another aspect of the present invention, there is provided a liquid crystal display apparatus comprising:

a plurality of gate signal lines provided in parallel with each other and spaced at substantially equal intervals;

a plurality of source signal lines provided in parallel with each other and spaced at substantially equal intervals, the source signal lines crossing to the gate signal lines at a right angle;

thin film transistors each of which is provided at each intersecting portions of the gate signal lines and the source signal lines;

terminals each of which is provided at each one end portion of the gate signal lines and at each one end portion of the source signal lines;

a first insulating film formed over the gate signal lines;

a second insulating film formed over both a neighborhood of the end portions of the gate signal lines and a neighborhood of the end portions of the source signal lines;

a plurality of auxiliary lines provided to surround a circumference of a displaying section in which the thin film transistors are provided, wherein the source signal lines are grouped into some groups of the source signal lines, the group consisting of a plurality of source signal lines which are adjacent to each other;

and an extended strength of the source signal line in an outside area of the displaying section and a surrounding strength of the auxiliary line in the outside area of the displaying section are so determined that, in each of the group, the source signal lines in each group have intersecting portions with a specified auxiliary line through the second insulating film;

and both the source signal lines and the auxiliary lines are provided by determining both the extended strength of the source signal lines and the surrounding strength of the auxiliary line.

Preferably, the second insulating film is made from one selected from the group consisting of silicon nitride and silicon oxide.

According to another aspect of the present invention, there is provided a liquid crystal display apparatus comprising:

a plurality of gate signal lines provided in parallel with each other and spaced at substantially equal intervals;

a plurality of source signal lines provided in parallel with each other and spaced at substantially equal intervals, the source signal lines crossing to the gate signal lines at a right angle;

thin film transistors each of which is provided at each intersecting portions of the gate signal lines and the source signal lines;

terminals each of which is provided at each one end portion of the gate signal lines and at each one end portion of the source signal lines;

an insulating film formed over the gate signal lines, a neighborhood of the end portions of the gate signal lines and a neighborhood of the end portions of the source signal lines;

a plurality of auxiliary lines provided to surround a circumference of a displaying section in which the thin film transistors are provided, wherein the source signal lines are grouped into some groups of the source signal lines, the group consisting of a plurality of source signal lines which are adjacent to each other;

and an extended strength of the source signal line in an outside area of the displaying section and a surrounding strength of the auxiliary line in the outside area of the displaying section are so determined that, in each of the group, the source signal lines in each group have intersecting portions with a specified auxiliary line through the insulating film;

and both the source signal lines and the auxiliary lines are provided by determining both the extended strength of the source signal lines and the surrounding strength of the auxiliary line;

and a metallic pattern film is further provided so that the metallic pattern film crosses to the auxiliary lines at a right angle and the metallic pattern film is provided over the auxiliary lines and on a boundary line, the boudary line grouping the source signal lines.

Preferably, the insulating film is made from one selected from the group consisting of silicon nitride, silicon oxide and tantalum oxide.

According to another aspect of the present invention, there is provided a liquid crystal display apparatus comprising:

- a plurality of gate signal lines provided in parallel with each other and spaced at substantially equal intervals;
- a plurality of source signal lines provided in parallel with each other and spaced at substantially equal intervals, the source signal lines crossing to the gate signal lines at a right angle;
- thin film transistors each of which is provided at each intersecting portions of the gate signal lines and the source signal lines;
- terminals each of which is provided at each one end portion of the gate signal lines and at each one end portion of the source signal lines;
- a first insulating film formed over the gate signal lines;
- a second insulating film formed over both a neighborhood of the end portions of the gate signal lines and a neighborhood of the end portions of the source signal lines;
- a plurality of auxiliary lines provided to surround a circumference of a displaying section in which the thin film transistors are provided,
- wherein the source signal lines are grouped into some groups of the source signal lines, the group consisting of a plurality of source signal lines which are adjacent to each other;
- and an extended strength of the source signal line in an outside area of the displaying section and a surrounding strength of the auxiliary line in the outside area of the displaying section are so determined that, in each of the group, the source signal lines in each group have intersecting portions with a specified auxiliary line through the second insulating film;
- and both the source signal lines and the auxiliary lines are provided by determining both the extended strength of the source signal lines and the surrounding strength of the auxiliary line;
- and a metallic pattern film is further provided so that the metallic pattern film crosses to the auxiliary lines at a right angle and the metallic pattern film is provided over the auxiliary lines and on a boundary line, the boundary line grouping the source signal lines.

Preferably, the second insulating film is made from one selected from the group consisting of silicon nitride and silicon oxide.

DETAILED DESCRIPTION OF THE INVENTION

Figure 1:
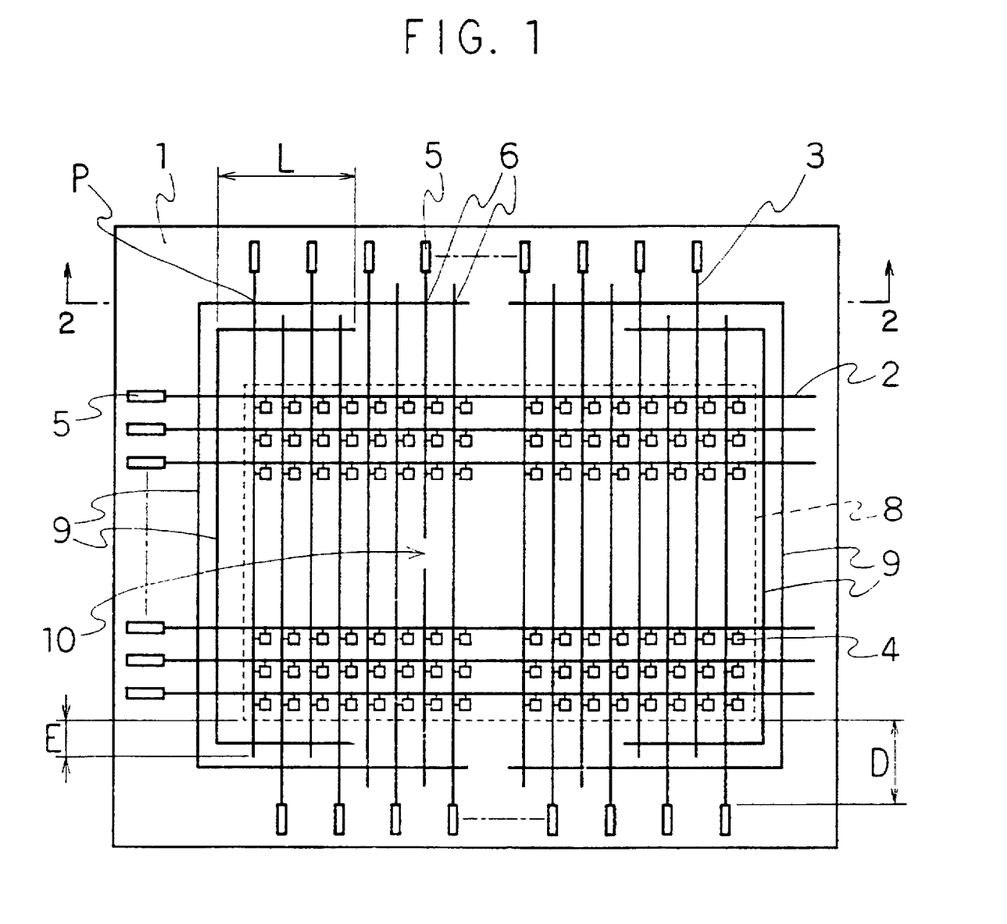
FIG. 1 is a plan view illustrating one embodiment of the liquid crystal display apparatus according to the present invention.
Figure 2:
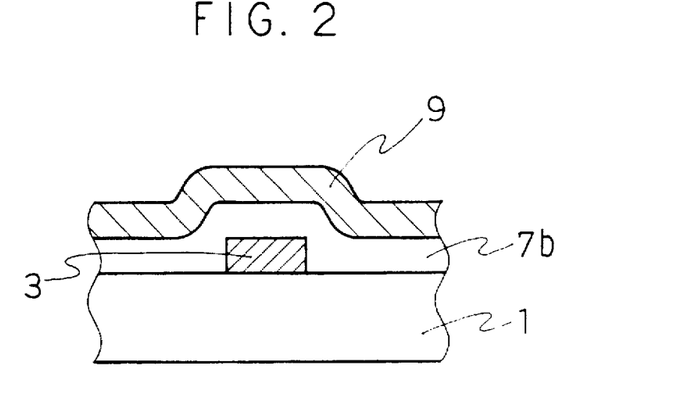
FIG. 2 is a cross sectional view illustrating point P and the neighborhood of the point P in a cross sectional view taken along line A—A in FIG. 1.

Firstly, one embodiment according to the present invention is explained in detail referring to FIG. 1 and FIG. 2. FIG. 1 is a plan view illustrating an example of the liquid crystal display implementing the present invention. FIG. 2 is a cross-sectional view illustrating point P and the neighborhood of the point P in a cross sectional view taken along line A—A in FIG. 1. In FIG. 1 and FIG. 2, reference numeral 1 indicates a transparent insulating substrate, and 2 indicates gate signal lines provided in parallel with each other and spaced at substantially equal intervals on the transparent insulating substrate such that a distance between each gate signal line and immediately adjacent gate signal line is substantially equal for gate signal line. Reference numeral 3 indicates source signal lines provided in parallel with each other and spaced at substantially equal intervals such that a distance between each source signal line and immediately adjacent source signal line is substantially equal for each source signal line. The source signal lines cross the gate signal lines at a right angle. Reference numeral 4 indicates thin film transistors each of which is provided at each intersecting portions of the gate signal lines and the source signal lines. Reference numeral 5 indicates terminals which are provided at each end portion of the gate signal lines and at each end portion of the source signal lines. Reference numeral 6 indicates intersecting portions, and numeral 7b indicates a second insulating film formed over a neighborhood of the end portions. Reference numeral 8 indicates a displaying section in which the thin film transistors are provided. Reference numeral 9 indicates an auxiliary line, and numeral 10 indicates disconnection defect. Since FIG. 1 is a plan view, the insulating film is not shown therein.

The source signal lines are grouped into some groups of the source signal lines. In each group, the source signal lines are arranged so that the group consists of a plurality of source signal lines which are adjacent to each other. As to the insulating film, a portion formed in the displaying section is referred to as a first insulating film 7a (not shown in figures), and the remaining portion formed in the outside area of the displaying section is referred to as a second insulating film 7b. Hereinafter, the two insulating films 7a and 7b are sometimes referred to as an insulating film 7. The above-mentioned auxiliary lines 9 are arranged and provided so that the auxiliary lines 9 surround the circumference of the displaying section and so that the auxiliary lines 9 form the intersecting portions 6 as right-angled portions, the portions 6 intervening the source signal lines 3 and the second insulating film 7b.

The above-mentioned arrangement as shown in FIG. 1, in which the gate signal lines, the source signal lines, the thin film transistors, the auxiliary lines and the insulating film are formed on the transparent insulating substrate and the portion of the insulating film in the inside area of the displaying section is a first insulating film and the portion of the insulating film in the outside area of the displaying section is a second insulating film, is similar to a conventional embodiment but there are several differences.

In the present invention, at least one group of source signal lines 3 is arranged so that only one of ends (i.e., the end opposing a respective terminal 5) of the lines 3 intersect the outer auxiliary lines 9. Consequently, the intersecting portion with the auxiliary line 9 is not formed at the end. This is a remarkable feature of the present invention. On the other hand, as to a group of the source signal lines 3 provided in the central area of the displaying section 8, the ends opposing the respective terminal 5 of the lines 3 intersect to the outer auxiliary lines 9.

In addition, contrary to the outer auxiliary line 9, the inner auxiliary line 9 is provided so that the ends opposing respective to each terminals 5 of the source lines 3 of a group in the neighborhood of the central area of the displaying section do not intersect and so that the source signal lines 3 are extended by the length (i.e., D or E) necessary for intersecting with the source signal lines 3 in both end portions and are terminated.

The length of the auxiliary line 9 is referred to as a surrounding length and the length D or E of the outside area of the displaying section 8 is referred to as an extended length. The auxiliary lines are thus provided, the source signal lines in each group have each intersecting portions of a specified auxiliary line.

In one group, the number of the source signal lines of which end portions opposing to these terminals 5 intersect auxiliary lines 9 at a right angle or do not intersect depends upon the number of the auxiliary lines provided in the outside area of the displaying section In FIG. 1, two auxiliary lines 9 are formed into the two grouped areas of the displaying section 8. If a large number of auxiliary lines can be provided keeping the given distance and parallel with each other, the number of group may be increased. In this case, since the number of the source signal lines in one group is fewer the parasitic capacitance of the auxiliary line may be decreased.

For example, in case of the SVGA class display, a plurality of auxiliary lines are grouped equally to the right side and the left side of the displaying section, and provided respectively. Then, it is sufficient that five auxiliary lines are provided. In this case, the number of the source signal lines in one group is 240. In order to repair the source signal line in the central area of the displaying section, the outermost auxiliary line 9 is employed. In this case, the number of the intersecting portions 6 is decreased to 1440, as compared with 2400 in the case of the conventional embodiment. The time constant of the signal is decreased to two-third of the conventional embodiment even if the capacitance of the intersecting portion is summed up. In such above-mentioned embodiment, when a disconnection defect 10 occurred and the source signal line 3 which had the defect 10 was repaired and the repaired panel was driven, there was no problem with regard to displaying characteristics.

Conduction test of the intersecting portion 6 and driving test of the repaired panel are performed with inspection instruments before a board for a driver IC and a board for a control circuit are mounted.

Further, in the above-mentioned embodiment, the number of the auxiliary lines assigned for a group of the source signal lines is substantially one, and the number of the source signal lines 3 of which the defects are repairable is limitted to one. Consequently, when two disconnection defects occur per one group, although the possibility is low, in the above-mentioned arrangement in which the auxiliary line 9 is assinged for one group of the source signal lines 3, the panel cannot be repaired. In order to solve the problem, it is enough that the number of the auxiliary lines is simply increased, for example the number is doubled.

Figure 3:
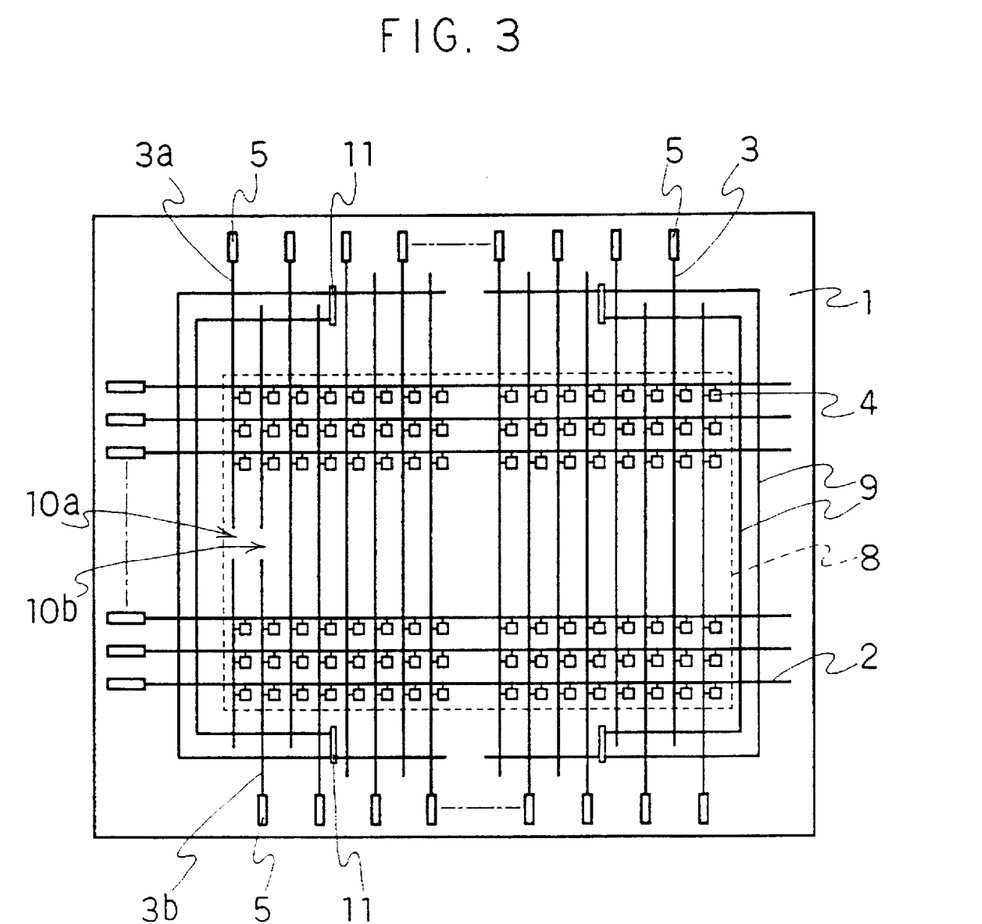
FIG. 3 is a plan view illustrating another embodiment of the liquid crystal display apparatus according to the present invention.
Figure 4:
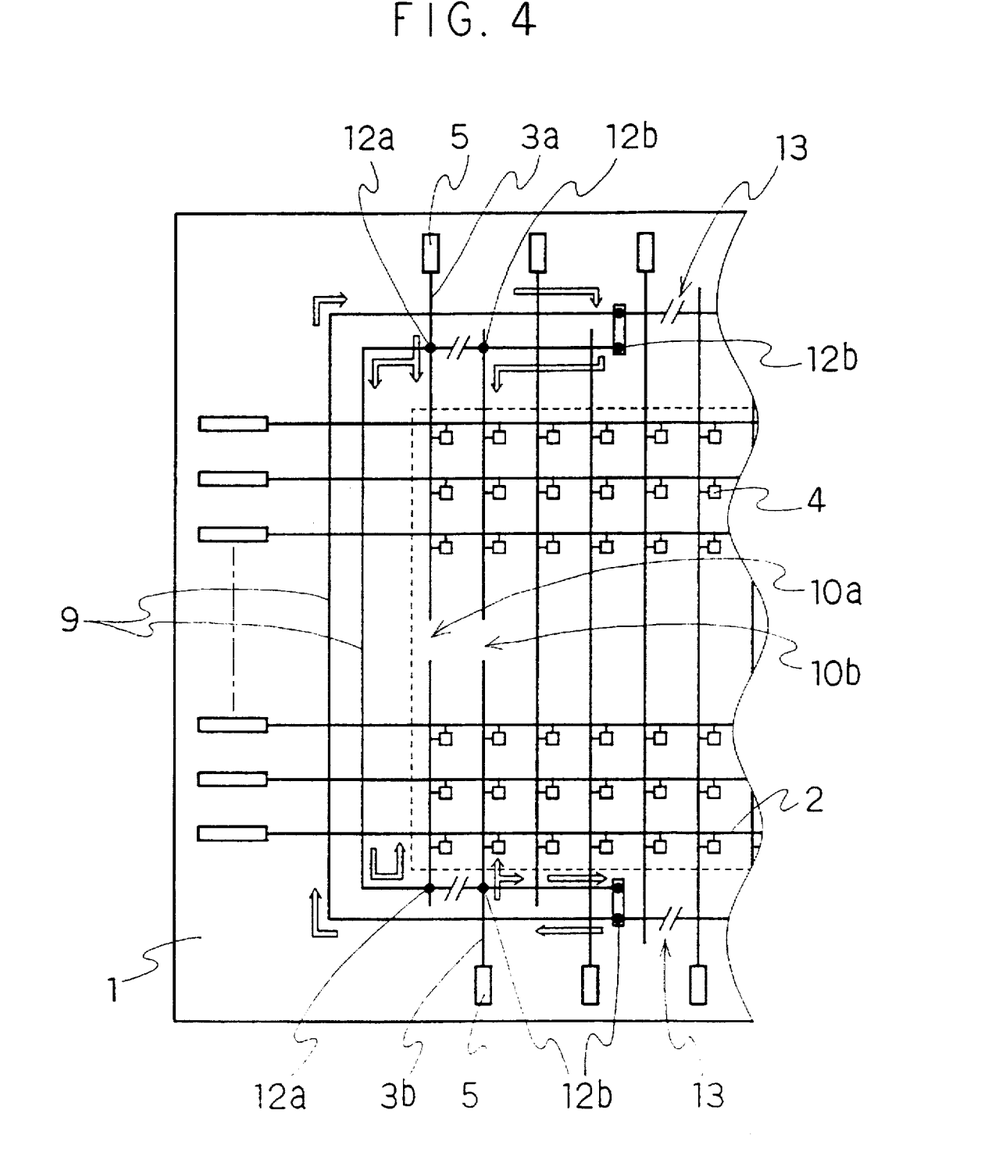
FIG. 4 is an explanatory diagram illustrating the method for repairing the disconnection defect in the liquid crystal display apparatus of another embodiment according to the present invention.

The actual liquid crystal panel lacks enough space for providing auxiliary lines on the panel. Then, the second embodiment according to the present invention is explaned hereinafter referring to the accompanied drawings, FIG. 3 and FIG. 4. FIG. 3 is a plan view illustrating another embodiment of the liquid crystal display implementing the present invention. In FIG. 3 and FIG. 4, reference numerals 1 to 9 indicate the same portions as the numerals in FIG. 1 and FIG. 2. Reference numerals 3a and 3b indicate source signal lines, numerals 10a and 10b indicate disconnection defect, numeral 11 indicates a metallic pattern film and numerals 12a and 12b indicate intersecting portions. As shown in FIG. 3, it is suggested that the metallic pattern film 11 be provided crossing two parallel auxiliary lines 9 at a right angle to the lines 9 and on a boundary line by which a plurality of source signal lines are grouped and that an additional insulating film intervenes between the lines 9 and the metallic pattern film 11. As to the metallic pattern film 11, if the film 11 is made with the same material and is made in the same layer, the second insulating film 7b can be substituted for the additional insulating film between the metallic pattern film 11 and the auxiliary line 9. Consequently, such an embodiment with the metallic pattern film 11 can be implemented without an additional process to the above-mentioned embodiment shown in FIG. 1.

FIG. 4 illustrates partially enlarged explanatory diagram taken from the FIG. 3. In accordance with the above-mentioned embodiment, when two disconnection defects shown as disconnection portions 10a and 10b occur on the source signal lines 3a and 3b in the neighborhood of the both ends of the displaying section 8, the signals are transmitted along the source signal lines 3a and 3b as shown with an arrow in FIG. 4 by connecting electrically the metallic pattern film 11 to the auxiliary line 9 at the intersecting portions 12a and 12b shown as black spots and further by cutting the auxiliary line 9 at an appropriate position, for example the position denoted as numeral 13 by laser irradiation.

When two source signal lines 3 such as source signal lines, 3a and 3b in each neighborhood of both ends of the displaying section 8 as shown in FIG. 4 are repaired, it is impossible to repair another source signal line in the neighborhood of the central area of the displaying section 8. Inspite of this, on the whole, significant enhancement in production yield is expected since occurrence of a case in which disconnection defect is repairable increases.

Silicon nitride, for example, which is a typical material for an insulating film, is employed for the insulating film 7. The film 7 may be formed, for example, with silicon oxide. When silicon oxide is employed, since although the relative dielectric constant of silicon nitride is approximately 7 and the relative dielectric constant of silicon oxide is approximately 4, the parasitic capacitance at the intersecting portion 6 may be decreased. Further, when the insulating film 7 is formed with tantalum oxide, since the relative dielectric constant of the tantalum oxide is approximately 20 and is significantly larger than the relative dielectric constant of silicon oxide, also in case when the thickness of the insulating film is formed thicker, displaying characteristic of the liquid crystal display is not deteriorated. Consequently, since the thickness of the insulating film in the intersecting portion 6 may be formed thicker, an occurrence of short-circuiting defect between layers due to foreign materials (or fine particles) or so may be suppressed.

The above-mentioned forming process corresponds to forming in the forming process for both the first insulating film 7a and the second insulating film 7b in one process. In spite of this, the first insulating film 7a and the second insulating film 7b may be formed individually in respective forming process. When the two films 7a and 7b are formed individually, the second insulating film 7b may be formed with silicon nitride and also may be formed with one of other materials, for example, silicon oxide. As described above, the parasitic capacitance at the intersecting portion 6 may be decreased.

In the liquid crystal display apparatus according to the present invention, since the number of the intersecting portions of the auxiliary line and the source signal line may be decreased, increase of the parasitic capacitance may be suppressed. As a result, since the repair of the disconnection defect can be confirmed before the board for the driver IC and the board for the control circuit are mounted, the liquid crystal display apparatus of which the production cost is low and the production yield is enhanced.

It should be understood that the apparatus and methods which have been shown and described herein are illustrative of the invention and are not intended to be limitative thereof. Clearly, those skilled in the art may conceive of variations or modifications to the invention. However, any such variations of modifications which falls within the purview of this description are intended to be included therein as well. The scope of the invention is limited only by the claims appended hereto.

What is claimed is:

1. A liquid crystal display apparatus comprising:
   a plurality of gate signal lines;
   a plurality of source signal lines, said source signal lines intersecting said gate signal lines;
   thin film transistors provided at each intersecting portion of said gate signal lines and said source signal lines in a display section of said liquid crystal display apparatus;
   terminals provided at one end portion of each gate signal line and at one end portion of each source signal line;
   an insulating film formed over said gate signal lines, over an area around said end portions of said gate signal lines and over an area around said end portions of said source signal lines; and
   a plurality of auxiliary lines provided outside a circumference of said displaying section in which said thin film transistors are provided,
   wherein each end of said source signal lines includes an extended length extending from said display section to cross at least one auxiliary line and wherein at least some ends of said source signal lines do not extend to cross said at least one auxiliary line located on an axial line of a respective source signal line.

2. A liquid crystal display apparatus of claim 1, wherein said insulating film includes a material selected from the group consisting of silicon nitride, silicon oxide and tantalum oxide.

3. A liquid crystal display apparatus of claim 1, further comprising:
   a first insulating film formed over said gate signal lines;
   a second insulating film formed over both an area around said end portions of said gate signal lines and an area around said end portions of said source signal lines.

4. A liquid crystal display apparatus of claim 3, wherein said second insulating film includes a material selected from the group consisting of silicon nitride and silicon oxide.

5. A liquid crystal display apparatus of claim 1, further comprising:
   wherein said source signal lines are grouped into groups of said source signal lines, each of said groups consisting of a plurality of source signal lines which are adjacent to each other;
   a metallic pattern film provided so that said metallic pattern film crosses to said auxiliary lines at a right angle and said metallic pattern film crossing said auxiliary lines at a boundary line between said source signal lines.

6. A liquid crystal display apparatus of claim 5, wherein said insulating film includes a material selected from the group consisting of silicon nitride, silicon oxide and tantalum oxide.

7. A liquid crystal display apparatus of claim 1, further comprising:
   a first insulating film formed over said gate signal lines;
   a second insulating film formed over both an area around said end portions of said gate signal lines and an area around said end portions of said source signal lines;
   a metallic pattern film provided so that said metallic pattern film crosses to said auxiliary lines at a right angle and said metallic pattern film crossing said auxiliary lines at a boundary line between said source signal lines.

8. A liquid crystal display apparatus of claim 7, wherein said second insulating film includes a material selected from the group consisting of silicon nitride and silicon oxide.

9. A liquid crystal display apparatus of claim 1, wherein said source signal lines are grouped into groups of said source signal lines, each said group consisting of a plurality of source signal lines which are adjacent to each other; and
   wherein, in at least one group, said extended length of one end of each source signal lines extends to cross only one of a plurality of auxiliary lines located on an axial line of said source signal line and the other end of each source signal line extends to cross all auxiliary lines located on an axial line of said source signal line.

10. A liquid crystal display apparatus comprising:
    a plurality of gate signal lines provided in parallel with each other and spaced at substantially equal intervals;
    a plurality of source signal lines provided in parallel with each other and spaced at substantially equal intervals, said source signal lines intersecting said gate signal lines at right angles;
    thin film transistors provided at each intersecting portion of said gate signal lines and said source signal lines in a display section of said liquid crystal display apparatus;
    terminals provided at one end portion of each gate signal line and at one end portion of each source signal line;
    an insulating film formed over said gate signal lines, over an area around said end portions of said gate signal lines and over an area around said end portions of said source signal lines; and a plurality of auxiliary lines provided outside a circumference of said displaying section in which said thin film transistors are provided, wherein each end of said source signal lines includes an extended length extending from said display section to cross at least one auxiliary line and wherein at least some ends of said source signal lines do not extend to cross said at least one auxiliary line located on an axial line of a respective source signal line.

* * * * *